(12) United States Patent
Terry et al.

(10) Patent No.: US 9,850,153 B1
(45) Date of Patent: Dec. 26, 2017

(54) CHEMICAL RELEASE SYSTEM

(71) Applicant: Systems IV, Inc., Chandler, AZ (US)

(72) Inventors: Sean Terry, Chandler, AZ (US); David C. Terry, Chandler, AZ (US)

(73) Assignee: Systems IV, Inc., Chandler, AZ (US)

(*) Notice: Subject to any disclaimer, the term of this patent is extended or adjusted under 35 U.S.C. 154(b) by 469 days.

(21) Appl. No.: 14/577,244

(22) Filed: Dec. 19, 2014

(51) Int. Cl.
| | |
|---|---|
| *B01D 29/56* | (2006.01) |
| *B01D 29/60* | (2006.01) |
| *B01D 63/08* | (2006.01) |
| *B01F 1/00* | (2006.01) |
| *B01F 3/12* | (2006.01) |
| *C02F 1/44* | (2006.01) |
| *C02F 1/66* | (2006.01) |
| *C02F 1/68* | (2006.01) |
| *C02F 5/08* | (2006.01) |

(52) U.S. Cl.
CPC ............. *C02F 5/08* (2013.01); *B01D 29/56* (2013.01); *B01D 29/60* (2013.01); *B01D 63/08* (2013.01); *B01D 63/082* (2013.01); *B01F 1/0033* (2013.01); *C02F 1/44* (2013.01); *C02F 1/66* (2013.01); *C02F 1/687* (2013.01); *B01F 2003/125* (2013.01); *C02F 2307/10* (2013.01)

(58) Field of Classification Search
CPC ...... B01D 27/08; B01D 27/14; B01D 27/146; B01D 29/05; B01D 29/56; B01D 29/60; B01D 35/00; B01D 35/005; B01D 35/02; B01D 63/08; B01D 63/082; B01D 63/088; B01F 1/0016; B01F 1/0022; B01F 1/0027; B01F 1/0033; B01F 2001/0044; B01F 2001/0055; B01F 2001/0061; B01F 3/12; B01F 2003/125; C02F 1/44; C02F 1/66; C02F 1/685; C02F 1/687; C02F 1/688; C02F 5/00; C02F 5/08; C02F 2307/10
See application file for complete search history.

(56) References Cited

U.S. PATENT DOCUMENTS

2006/0273003 A1* 12/2006 Sudo .................... B01D 63/082
                                                              210/498

* cited by examiner

*Primary Examiner* — Lucas Stelling
(74) *Attorney, Agent, or Firm* — Booth Udall Fuller, PLC (57) ABSTRACT

A feeding head assembly and a chemical release system for eliminating scale conditions and maintaining a neutral pH in potable water is disclosed. The feeding head assembly may include a composite membrane system comprising at least one semi-permeable layer and at least one filter layer. A chemical release system may include a cartridge or vessel. The cartridge may include a hollow body with two opposing open ends. A time-release pouch may be located within the hollow body and holds a composition that mixes with potable water to eliminate scale conditions and maintain a neutral pH in the potable water. A feeding head assembly may be coupled within the hollow body between the time-release pouch and one open end of the hollow body.

14 Claims, 4 Drawing Sheets

FIG. 6

CHEMICAL RELEASE SYSTEM

BACKGROUND

Technical Field

This document relates to a chemical release system and method for adjusting pH of potable water in residential homes and commercial appliances.

Background

Conventional chemical or "sieve" filtration will typically provide a higher quality water output than a raw-water source, yet when scale-causing water chemistries are present, water will invariably produce damaging scale buildup on equipment. Scale is detrimental as it builds up on equipment surfaces because it reduces energy and chemical efficiency in equipment.

Conventional filters only manage water to the degree of the quality of the filter. In most cases that quality is very poor. The water filtration industry sells water "polish" systems that require, in most cases, multiple filters that accumulate large investments. None of the filters actually control the water (the water chemistries and conditions). Instead, conventional water filtration must evaluate existing water conditions and then suggest filters that best manage the problems.

Conventional water filters marginally affect water hardness, pH, alkalinity, calcium (e.g., calcium carbonate ($CaCO_3$)), magnesium, and/or total dissolved solids are the primary cause of scale buildup. Chemical water filtration is unable to sieve out these scale causing water conditions. Only debris and particles large enough to be caught in chemical filter barriers can be removed until they clog or have reached capacity. At that point, conventional water filters can become an additional problem to equipment by "dragging" on water supply lines merely through their function. Regardless of the degree of filtration, water flow is restricted.

SUMMARY

Aspects of this document relate to a feeding head assembly, a chemical release system, and a method for adjusting pH of potable water in residential homes and commercial appliances to eliminate scale conditions. These aspects may include, and implementations may include, one or more or all of the components and steps set forth in the appended CLAIMS.

In one aspect, an implementation of a feeding head assembly for eliminating scale conditions and maintaining a neutral pH in potable water is disclosed. The feeding head assembly may include a composite membrane system comprising at least one semi-permeable layer and at least one filter layer.

Particular implementations may include one or more or all of the following.

The feeding head assembly may include a housing defining an internal cavity and opposing first and second end openings. A first end plate defining a central through hole may be coupled to the first end opening of the housing. At least one filter media layer may be coupled between the first end opening of the housing and the inlet end plate. A restrictor plate defining a central through hole configured to help control water flow may be within the housing and adjacent the at least one filter media layer. At least one semi-permeable membrane configured to help control water flow may be within the housing and adjacent the restrictor plate. A second end plate defining a central through hole may be coupled within the second end opening of the housing.

The housing may have a smaller diameter than the end plate.

The at least one filter media layer may be two filter media layers, the other of which coupled to the second end opening of the housing.

The central through hole of the restrictor plate may have a smaller diameter than the central through hole of the inlet end plate.

In another aspect, an implementation of a chemical release system for eliminating scale conditions and maintaining a neutral pH in potable water is disclosed. The chemical release system may include a cartridge. The cartridge may include a hollow body defining a first open end opposite a second open end. A time-release pouch may be located within the hollow body and holds a composition that mixes with potable water to eliminate scale conditions and maintain a neutral pH in the potable water. An end plug may at least be partially coupled within the hollow body at the first open end of the body. A feeding head assembly may be coupled within the hollow body between the time-release pouch and the first open end of the hollow body. A through hole configured to let water pass into the hollow body may be defined through the hollow body and positioned between the first open end of the hollow body and the feeding head assembly.

Particular implementations may include one or more or all of the following.

The feeding head assembly may include a composite membrane system comprising at least one semi-permeable layer and at least one filter layer. A chemical release system may include a cartridge or vessel.

The feeding head assembly may include a housing defining an internal cavity and opposing first and second end openings. A first end plate defining a central through hole may be coupled to the first end opening of the housing. At least one filter media layer may be coupled between the first end opening of the housing and the inlet end plate. A restrictor plate defining a central through hole configured to help control water flow may be within the housing and adjacent the at least one filter media layer. At least one semi-permeable membrane configured to help control water flow may be within the housing and adjacent the restrictor plate. A second end plate defining a central through hole may be coupled within the second end opening of the housing.

At least one semi-permeable membrane configured to help control water flow into the hollow body may be coupled over the at least one first through hole to the hollow body.

The at least one semi-permeable membrane may be coupled over the at least one first through hole to an inside surface of the hollow body.

In still another aspect, an implementation of a chemical release system for eliminating scale conditions and maintaining a neutral pH in potable water is disclosed. The chemical release system may include a cartridge. The cartridge may include a hollow body defining a first open end opposite a second open end. A time-release pouch may be located within the hollow body and holds a composition that mixes with potable water to eliminate scale conditions and maintain a neutral pH in the potable water. An end plate may be within the hollow body between the time-release pouch and the first open end of the hollow body. A feeding head assembly may be coupled within the hollow body between the time-release pouch and the second open end of the hollow body. At least one first through hole configured to let water pass into the hollow body may be defined through the hollow body and positioned between the end plate and the feeding head assembly. At least one second through hole configured to let water pass into the hollow body may be defined through the hollow body and positioned between the feeding head assembly and the second open end of the hollow body.

Particular implementations may include one or more or all of the following.

The feeding head assembly may include a composite membrane system comprising at least one semi-permeable layer and at least one filter layer. A chemical release system may include a cartridge or vessel.

The feeding head assembly may include a housing defining an internal cavity and opposing first and second end openings. A first end plate defining a central through hole may be coupled to the first end opening of the housing. At least one filter media layer may be coupled between the first end opening of the housing and the inlet end plate. A restrictor plate defining a central through hole configured to help control water flow may be within the housing and adjacent the at least one filter media layer. At least one semi-permeable membrane configured to help control water flow may be within the housing and adjacent the restrictor plate. A second end plate defining a central through hole may be coupled within the second end opening of the housing.

The at least one first through hole may be positioned between the end plate and the pouch. The at least one first through hole may be positioned at a mid section of the hollow body adjacent the pouch. The at least one first through hole may be positioned between the feeding head assembly and the pouch. The at least one first through hole may include any two of the forgoing through holes or all three of the forgoing through holes.

The at least one second through hole may include two through holes.

At least one semi-permeable membrane configured to help control water flow into the hollow body may be coupled over the at least one first through hole to the hollow body.

The at least one semi-permeable membrane may be coupled over the at least one first through hole to an inside surface of the hollow body.

The foregoing and other aspects, implementations, features, and advantages will be apparent from the DESCRIPTION and DRAWINGS, and from the CLAIMS.

DRAWINGS

Implementations will hereinafter be described in conjunction with the appended DRAWINGS, where like designations denote like elements.

DESCRIPTION

This document features a feeding head assembly, a chemical release system, and a method for adjusting pH of potable water in residential homes and commercial appliances to eliminate scale conditions. There are many features of feeding head assembly, chemical release system, and method implementations disclosed herein, of which one, a plurality, or all features or steps may be used in any particular implementation.

In the following description, reference is made to the accompanying DRAWINGS which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

Structure

There are a variety of chemical release system implementations. A chemical release system implementation may generally include a cartridge or vessel. The cartridge may include a hollow body with two opposing open ends. A time-release pouch may be located within the hollow body and holds a composition that mixes with potable water to eliminate scale conditions and maintain a neutral pH in the potable water. A feeding head assembly may be coupled to an open end of the hollow body.

Notwithstanding, with reference to FIGS. 1A, 2A, and 3-4 and for the exemplary purposes of this disclosure, a first chemical release system implementation is depicted that may be employed in a steam cooker application for example, among other applications. This first chemical release system implementation includes cartridge or vessel 10 that includes body 20, feeding head assembly 50, end plug 30, and time-release pouch 40. Cartridge 10 may be a stand-alone unit or it may be hermetically sealed or removably located in a housing depending upon the application.

Figure 1A:
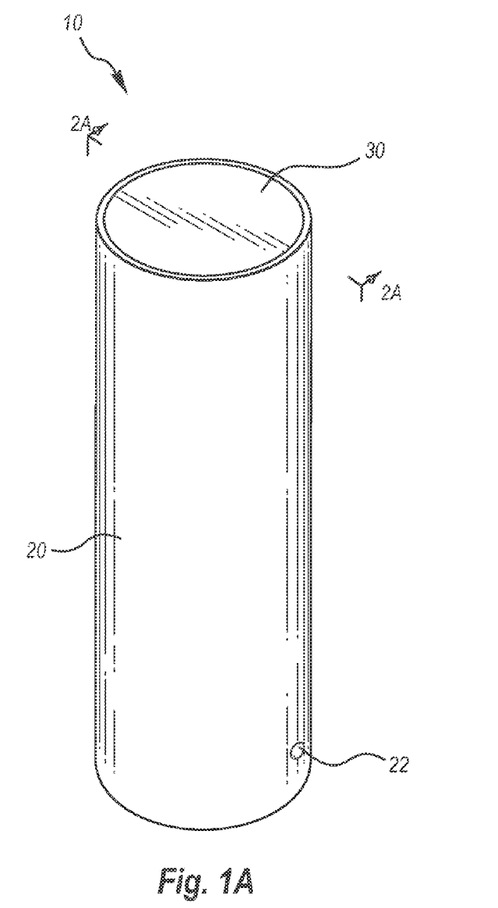
FIG. 1A is a perspective view of a first chemical release system implementation.
Figure 1B:
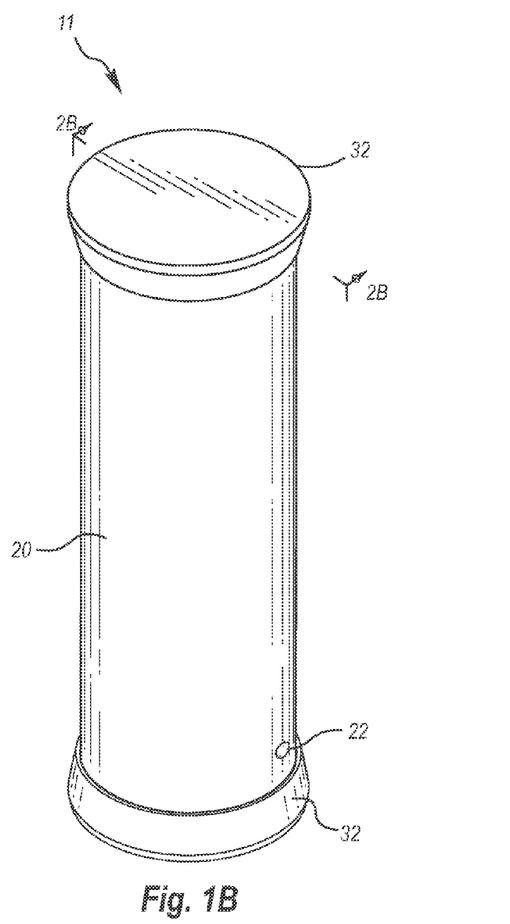
FIG. 1B is a perspective view of a second chemical release system implementation.
Figure 2A:
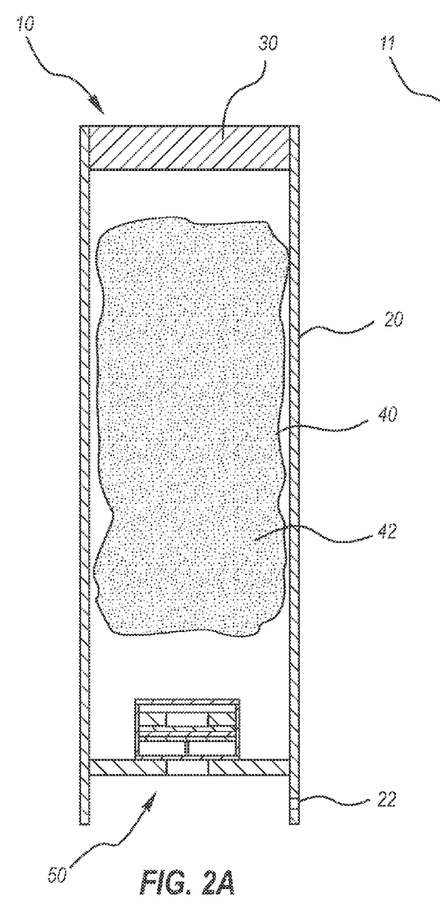
FIG. 2A is a cross-sectional view of the chemical release system implementation of FIG. 1A taken along line 2A-2A.
Figure 3:
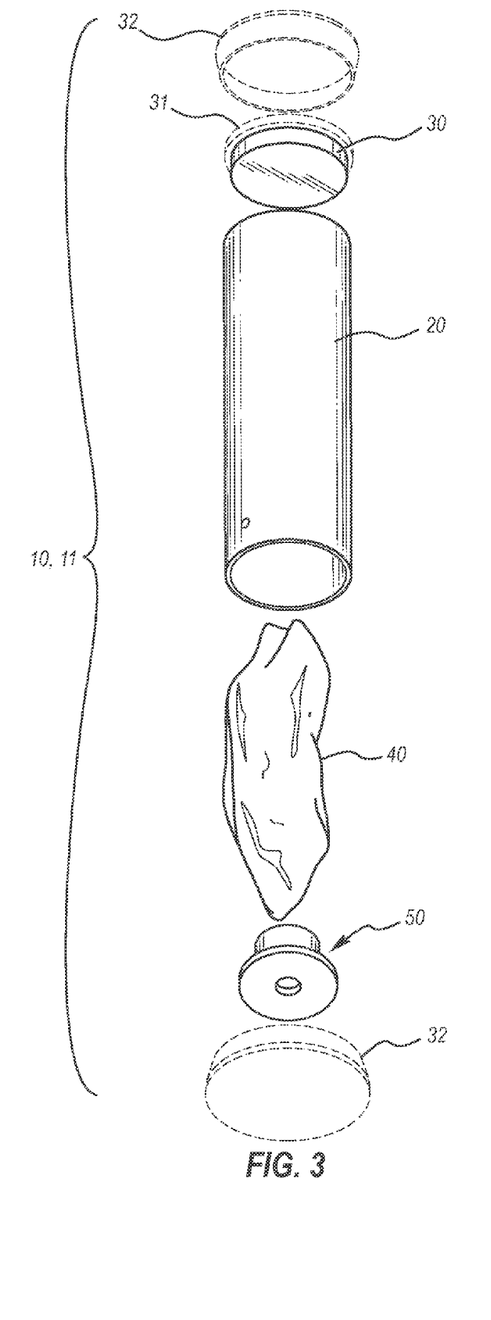
FIG. 3 is an exploded view of the components of the chemical release system implementation of FIG. 1.

Body 20 is hollow and configured to hold time-release pouch 40 therein. Body 20 may be an annularly cylindrical housing defining an internal cavity and opposing and first or lower (as the case may be) and second or upper end (as the case may be) openings. Adjacent the lower end opening and defined through body 20 is inlet/outlet hole 22 configured for both letting water pass into body 20 adjacent/below feeding head assembly 50 and up into the internal cavity body to saturate pouch 40 and agitate composition 42 so that the water becomes treated (while the equipment is stopped and the water is not actively flowing in the feed line to the equipment) and letting treated water pass back out of body 20 while the equipment is operating (the water is flowing in the feed line).

For the exemplary purposes of this disclosure, body 20 may be a 2"×13" SH40 PVC pipe. Inlet/outlet hole 22 may be a ⅛" hole.

Feeding head assembly 50 is configured to be in fluid communication with a cold water feed line running from a water source to equipment and interact with a portion of water running through the feed line into and then out of body 20. Feeding head assembly 50 may be coupled within hollow body 20 between time-release pouch 40 and end plug 30.

Figure 4:
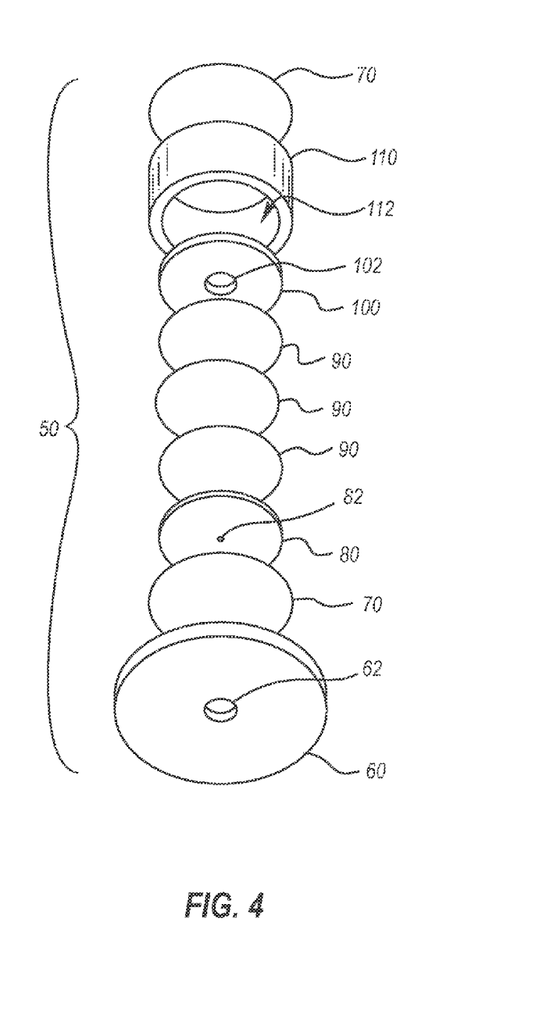
FIG. 4 is an exploded view of the feeding head assembly of the chemical release system implementation of FIG. 1.

Feeding head assembly 50 is generally cylindrical and defines a series of concentric through holes extending from an inlet side to an outlet side adjacent pouch 40 on opposite sides of feeding head assembly 50. Feeding head assembly 50 may include a composite membrane system comprising at least one semi-permeable layer and at least one filter layer.

Specifically, feeding head assembly 50 may include inlet end plate 60, at least one filter media 70, restrictor plate 80, at least one semi-permeable membrane 90, outlet end plate 100, and housing 110.

Inlet end plate 60 may generally be cylindrical and may have a central through hole 62. For example, end plate 60 may be disc shaped as depicted and may slip fit through the lower end opening of body 20 within the interior cavity of body 20 and be coupled therein appropriately.

Housing 110 may be coupled onto inlet end plate 60. Housing 110 may be an annularly cylindrical housing defining an internal cavity 112 and opposing upper and lower end openings. Housing 110 may have a smaller diameter than end plate 60.

At least one filter media layer 70 may be coupled between the lower end opening of body 110 and plate 60. At least one filter media layer 70 may be disc shaped. At least one filter media layer 70 may include two filter media layers for example, the other filter medial layer 70 coupled to the upper end opening of housing 110.

Restrictor plate 80 may generally be cylindrical and may have a central through hole 82. Central through hole 82 may be a smaller diameter than central through hole 62. For example, restrictor plate 80 may be disc shaped as depicted and may be slip fit within the interior cavity 112 of housing 110 and be coupled therein appropriately adjacent at least one filter media layer 70.

At least one semi-permeable layer or membrane 90 (along with restrictor plate 80) may help control the flow of water into and out of body 20. At least one semi-permeable membrane 90 may be coupled between restrictor plate 80 and end plate 100. At least one semi-permeable membrane 90 may be disc shaped. At least one semi-permeable membrane 90 may include two, three, four, five, or more membrane layers for example, all stacked/layered adjacent one another to achieve desire porosity. At least one semi-permeable membrane 90 may have a mean pore size that ranges from 1 to 5 microns.

End plate 100 may generally be cylindrical and may have a central through hole 102. For example, end plate 100 may be disc shaped as depicted and may slip fit through the upper end opening of housing 110 within the interior cavity 112 of housing 110 and be coupled therein appropriately. Thus, within internal cavity 112 of housing 110, restrictor plate 80 and at least one semi-permeable membrane 90 are sandwiched in between outlet end plate 100 and inlet end plate 60.

For the exemplary purposes of this disclosure, inlet end plate 60 may be a 2"×¼" disc with a ½" central through hole 62. Filter media layer 70 may be a 1" spunbond polyester disc. Restrictor plate 80 may be a 1"×⅛" disc with a ½" central through hole 82. Semi-permeable layer or membrane 90 may be a spunbond olefin fiber or flashspun high-density polyethylene (HDPE) disc. Outlet end plate 100 may be a 1"×⅛" disc with a 1/32" central through hole 102. Housing 110 may be a 1"×½" PVC pipe.

Olefin fiber is a synthetic fiber made from a polyolefin, such as polypropylene or polyethylene. That is, olefin fiber is a manufactured fiber in which the fiber forming substance is any long-chain synthetic polymer composed of at least 85% by weight of ethylene, propylene, or other olefin units. Olefin fiber that may be used is sold under the brand name TYVEK®.

Flashspun high-density polyethylene (HDPE) that may be used is sold under the brand name DuPont™ Flashspun HDPE Filtration Media (1073B). DuPont™ Flashspun HDPE Filtration Media is made with a very fine network of random filaments which can be consolidated by a multi-step bonding process. This allows a high liquid efficiency at a nominal rating of about 1 micron, even though the typical mean flow pore sizes range from 2-5 microns.

Typical Material Properties are as follows: Basis Weight=1.2-2.2 osy; Thickness=5-7 mils at 7.15 psi; Mean Pore Size=2 microns; Grab Tensile Strength, MD=40-96 lb.; Grab Tensile Strength, CD=57-102 lb.; Gurley Hill Porosity=5-32 sec/100 cc; Bubble Point=7-8 microns; Mullenburst=96-120 psi.

Spunbond polyester that may be used is sold under the brand name Reemay™. Spunbond polyester media contains no binders, so the filtering area is not limited and there are no potential contaminants to leach out during the filtration process.

End plug 30 may generally be cylindrical. For example, end plug 30 may be disc shaped as depicted and may slip fit within the upper end opening of body 20 and be coupled therein appropriately.

For the exemplary purposes of this disclosure, end plug 30 may be a 2"×¼" disc.

Time-release pouch 40 is configured to hold and release over time composition 42 as it mixes with redirected water from the feed line to control the pH of the water (maintain an neutral pH of 7) and prevent the build-up of scale in equipment. Composition 42 includes a proprietary blend of biodegradable citric acid ($H_3C_6H_5O_7$) and polyphosphate ($PO_4$) or other phosphates sold under the brand name CITRYNE®. Citric acid is an FDA approved food product and polyphosphate is an NSF certified material for drinking water applications. Without being bound by theory, it is believed the phosphates serve a dual purpose of cleaning as well as buffering, and the chelating agent citric acid serves the dual function of dissolving scale and preventing precipitation of phosphates.

For the exemplary purposes of this disclosure, time-release pouch 40 may be a 12"×6¾" fold spunbond olefin fiber or flashspun high-density polyethylene (HDPE) bag. Olefin fiber that may be used is sold under the brand name TYVEK®. Flashspun high-density polyethylene (HDPE) that may be used is sold under the brand name DuPont™ Flashspun HDPE Filtration Media.

Additional Implementations

Many additional implementations are possible.

For the exemplary purposes of this disclosure and referring to FIGS. 1B, 2B, and 3-4, a second chemical release system implementation is disclosed that again may be employed in a steam cooker application for example, among other applications. This second chemical release system implementation is substantially similar to the first chemical release system implementation described previously, the principal differences being a cartridge or vessel 11 that includes end plug 31 and end caps 32. Cartridge 11 may be a stand-alone unit or it may be hermetically sealed or removably located in a housing depending upon the application.

Figure 2B:
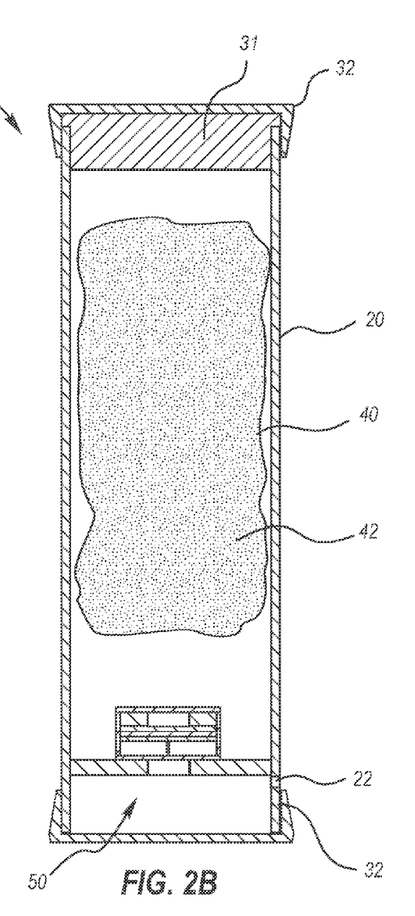
FIG. 2B is a cross-sectional view of the chemical release system implementation of FIG. 1B taken along line 2B-2B.

End plug 31 defines a shoulder that only allows the lower portion of the end plug to slip fit within the upper end opening of body 20.

End cap 32 is configured to serve as a support stand and a non-skid surface to keep pressure vessel 11 upright. End cap 32 also serves to cover up the coupling of end plug 32 and body 20, to cover up the lower end opening of body 20, and to provide a clean appearance as well as other trade dress purposes.

Figure 5:
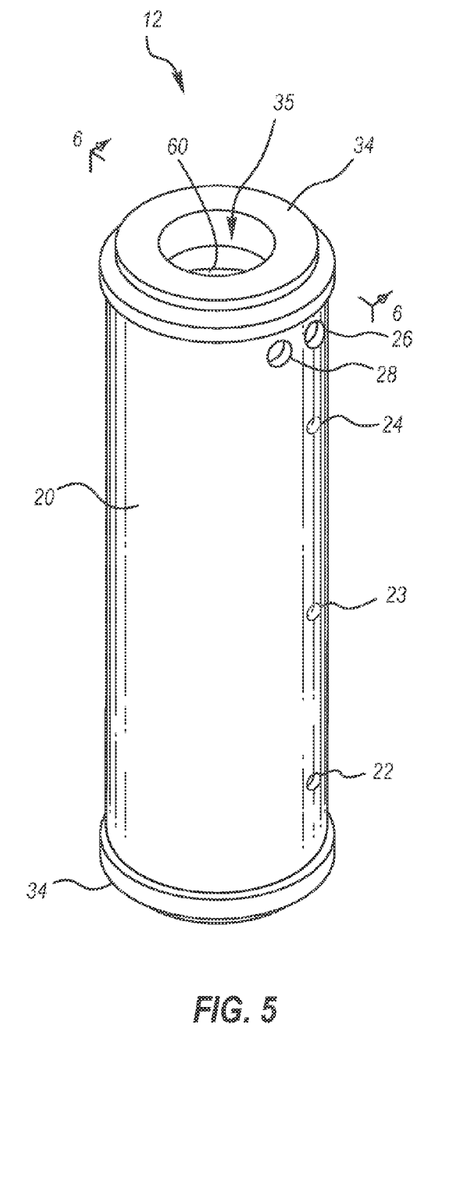
FIG. 5 is a perspective view of a third chemical release system implementation.
Figure 6:
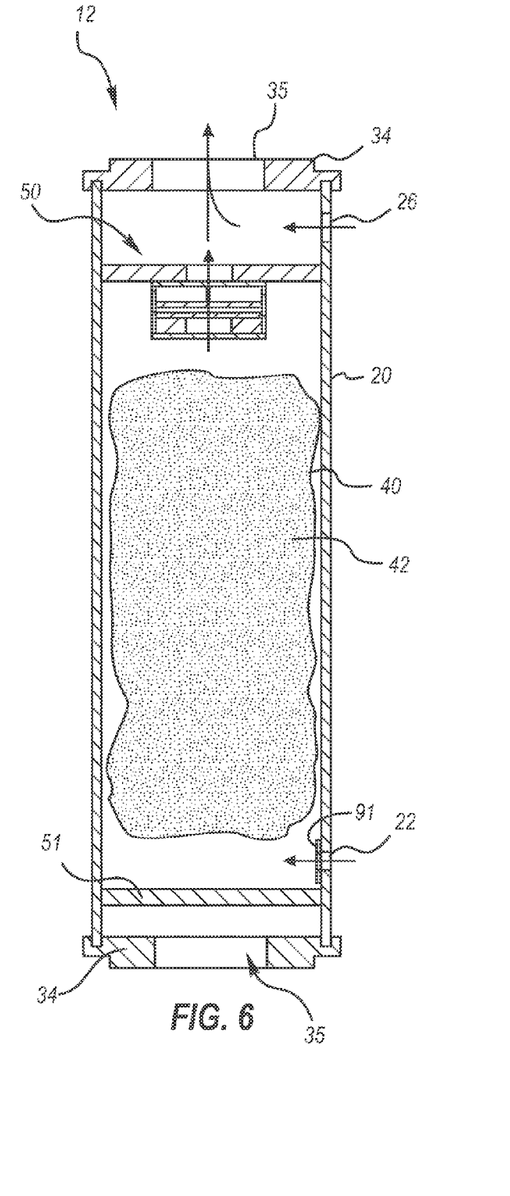
FIG. 6 is a cross-sectional view of the chemical release system implementation of FIG. 5 taken along line 6-6.

For the exemplary purposes of this disclosure and referring to FIGS. 5 and 6, a third chemical release system implementation is disclosed that may be employed in an icemaker application for example, among other applications. This third chemical release system implementation is substantially similar to the first and second chemical release system implementations described previously, the principal differences being a cartridge or vessel 12 that includes holes 26 and 28, plate 51, and end cap fittings 34. Cartridge 12 may be a stand-alone unit or it may be hermetically sealed or removably located in a housing depending upon the application.

Inlet/outlet 22 is configured to let water pass into body 20 into the internal cavity of body 20 to help saturate pouch 40 and agitate composition 42 so that the water becomes treated (whether the equipment is stopped and the water is not actively flowing in the feed line to the equipment or while the equipment is operating and the water is flowing in the feed line). Inlet/outlet hole 22 is defined through body 20 and may be positioned anywhere between plate 51 at a lower end portion of body 20 and feeding head assembly 50 at an upper end portion of body 20. For example, inlet/outlet hole 22 may be located just to the inside of plate 51 below pouch 40 and opened to the internal cavity of body 20 as depicted. Inlet/outlet hole 22 facilitates more and quicker saturation of water with composition 42 (composition 42 will deplete faster).

Alternatively or in addition to inlet/outlet hole 22, other inlet/outlet holes 23 and 24 may be defined in body 20 and opened to the internal cavity of body 20 to help saturate pouch 40 and agitate composition 42 so that the water becomes treated. Inlet/outlet hole 23 may be located at a mid section of body 20 opening directly adjacent pouch 40. Inlet/outlet hole 24 may be located just to the inside of feeding head assembly 50 above pouch 40 and facilitates less and slower saturation of water with composition 42 (composition 42 will last longer) because agitation of composition 42 will lessen over time as composition 42 is depleted and less of composition 42 comes into contact with turbulence in the water.

For the exemplary purposes of this disclosure, hole 22 (or hole 23 or hole 24) may be a ⅛" diameter hole.

Optionally, at least one semi-permeable layer or membrane 91 may help control the flow of water into and out of body 20. At least one semi-permeable membrane 91 may be disc shaped and may be coupled over hole 22 (and/or hole 23 and/or hole 24) to the inside surface (or outside surface) of body 20. At least one semi-permeable membrane 91 may include two, three, four, five, or more membrane layers for example, all stacked/layered adjacent one another to achieve desire porosity. At least one semi-permeable membrane 91 may have a mean pore size that ranges from 1 to 5 microns. For the exemplary purposes of this disclosure, at least one semi-permeable layer or membrane 91 may be a spunbond olefin fiber or flashspun high-density polyethylene (HDPE) disc as previously described.

At least one other inlet/outlet hole may be defined through body 20 and configured for letting water pass into body 20 adjacent/above feeding head assembly 50 and out of end cap fitting 34 to help pull through a venturi effect treated water in the internal cavity up through feeding head assembly 50 and out of body 20 into the feed line. The at least one other inlet/outlet hole may be positioned between feeding head assembly 50 and end cap fitting 34 at an upper end portion of body 20. The at least one other inlet/outlet hole may include two holes. The two holes may be side by side, one above the other, positioned at different locations around body 20, and the like for example. For the exemplary purposes of this disclosure, the at least one other inlet/outlet hole may include hole 26 and hole 28. For the exemplary purposes of this disclosure, holes 26 and 28 may each be a ⅛" to ½" diameter hole, or a ¼" to ⅜" diameter hole.

Plate 51 is similar to an end plug. Plate 51 may generally be cylindrical and may be disc shaped as depicted and may be slip fit within the interior cavity of body 20 and be coupled therein appropriately adjacent the lower end of opening of body 20.

End cap fittings 34 facilitate holding cartridge 12 in place within a housing for example. End cap fittings 34 may have a central through hole 35. Hole 35 is configured to couple with a corresponding protrusion or boss in a housing (such as a sump housing or quick change filter housing for example) to hold cartridge 12 in place therein.

Feeding head assembly 50 may be coupled within hollow body 20 between time-release pouch 40 and end cap fitting 34. Feeding head assembly 50 controls or regulates the flow of treated water from within the internal cavity of body 20 out to the water feed line.

For the exemplary purposes of this disclosure, other chemical release system implementations may include a lower portion of an end plug and an upper end opening of body 20 that are each threaded to provide for a threaded fit. A gasket or O-ring could also be provided to form a seal between the shoulder of such an end plug and the top of body 20. Such a threaded fitting would provide for an arrangement allowing for feeding head assembly 50 and body 20 to remain installed with respect to a feed line and time-release pouch 40 to be discarded and replaced as needed.

For the exemplary purposes of this disclosure, yet other chemical release system implementations may include bodies and end plugs that are integrally joined together and form unitary housings.

For the exemplary purposes of this disclosure, even other chemical release system implementations may include any component combination of any of the foregoing implementations.

Further implementations are within the CLAIMS.

Specifications, Materials, Manufacture, and Assembly

It will be understood that chemical release system implementations are not limited to the specific components disclosed herein, as virtually any components consistent with the intended operation of a chemical release system implementation may be utilized. Thus, for example, although particular components for chemical release system implementations are disclosed, such components may include any shape, size, style, type, model, version, measurement, concentration, material, quantity, and/or the like consistent with the intended operation of a chemical release system implementation. Implementations are not limited to uses of any specific components, provided that the components selected are consistent with the intended operation of a chemical release system implementation.

Accordingly, for the exemplary purposes of this disclosure, and not by way of limitation, different chemical release system implementations may have a flow rate of about 5.5

GPM and be rated up to about 100 degrees Fahrenheit and about 80-125 psi. Some chemical release system implementations may have up to a six-month life span (processing about 40,000 gallons of water).

Again, for the exemplary purposes of this disclosure, the components defining any chemical release system implementation may be formed of any of many different types of materials or combinations thereof that can readily be formed into shaped objects provided that the materials and components selected are consistent with the intended operation of a chemical release system. For example, the components may be formed of: rubbers (synthetic and/or natural), neoprene, and/or other like materials; glasses (such as fiberglass), carbon-fiber, aramid-fiber, any combination thereof, and/or other like materials; polymers such as thermoplastics (such as ABS, PVC, Fluoropolymers, Polyacetal, Polyamide, Polycarbonate, Polyethylene, Polypropylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any chemical release system implementation may be purchased pre-manufactured or manufactured separately and then assembled together. However, any or all of the components may be manufactured simultaneously and integrally joined with one another. The various implementations may be manufactured using conventional procedures as added to and improved upon through the procedures described in this disclosure. Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. Components that are manufactured separately may then be coupled with one another in any manner, such as by/with adhesive, a weld, a fitting, a fastener (e.g., a bolt, a nut, a screw, a nail, a rivet, a pin, and/or the like), any combination thereof, and/or the like for example, depending on, among other considerations, the particular material(s) forming the components.

Accordingly, for the exemplary purposes of this disclosure, cartridge 10 may be assembled as depicted in FIG. 3 in the following manner. End plug 30 may be coupled to body 20. Time-release pouch 40 may then be inserted into the internal cavity of body 20. Then, feeding head assembly 50 may be coupled within body 20.

While the assembly of cartridge 10 has been described in a particular sequence of steps with reference to the drawing figures, it will be understood that the assembly of cartridge 10 is not limited to the specific order of steps as disclosed. Any steps or sequence of steps of the assembly of cartridge 10 indicated herein are given as examples of possible steps or sequence of steps and not as limitations, since various assembly processes and sequences of steps may be used to assemble cartridge 10. Other cartridge implementations may be assembled in a similar manner.

Use

Chemical release system implementations are particularly useful in eliminating scale conditions (e.g., calcium carbonate ($CaCO_3$)) and maintaining a neutral pH of 7 in potable water used in residential homes and commercial appliances and equipment for restaurants, hospitals, schools, commercial kitchens, convenience stores, cooling towers and many other applications, including heat exchange applications. Chemical release system implementations may be contained within other structures (either hermetically sealed in or removably located in a housing for example) and mounted horizontally or vertically on a wall or other surface for example, placed on a floor, and the like. However, implementations are not limited to uses relating to the foregoing. Rather, any description relating to the foregoing is for the exemplary purposes of this disclosure, and implementations may also be used with similar results for a variety of other applications.

For the exemplary purposes of this disclosure, chemical release system implementations may be installed in the following manner. The cartridge may be placed and contained within another structure (either hermetically sealed in or removably located in a housing for example). The housing may then be attached to a mounting bracket or panel if needed for the particular application. Regardless, once the water supply is turned off to the feed line, the housing may be positioned (whether attached to a wall or placed on the floor) horizontally or vertically. Then, the inlet/outlet of the housing may be coupled with the feed line tubing using appropriate fittings (e.g., push-to-connect fittings, compression fittings, or the like). At this point, the water supply can be turned back on.

Once installed, chemical release system implementations may be used to eliminate scale concerns from water by controlling the water, including its pH, before it enters the equipment. Chemical release system implementations work both while the equipment is operating (the water is flowing) and while the equipment is stopped (the water is not flowing).

Accordingly, for the exemplary purposes of this disclosure and referring to FIG. 2A, when cartridge 10 is in fluid communication with the cold water feed line of equipment and the equipment is not running and the water flow is stopped, water in body 20 as well as stagnate water in any housing or tubing becomes saturated by composition 42. When the water flow resumes, the saturated water is moved to the equipment.

Specifically, water travels through feed assembly 50 under pressure to fill body 20 and saturate pouch 40. The water mixes with composition 42 in time-release pouch 40 to neutralize scale causing water conditions, such as calcium (e.g., calcium carbonate ($CaCO_3$)) and magnesium for example, and to neutralize pH. As the equipment runs, the saturated and treated water in body 20 is pulled back out through feed assembly 50 through a venturi effect, then out of hole 22 and to the equipment feed line.

For the exemplary purposes of this disclosure and referring to FIG. 6, when cartridge 12 is in fluid communication with the cold water feed line of equipment and the equipment is not running and the water flow is stopped, water in body 20 as well as stagnate water in any housing or tubing becomes saturated by composition 42. When the water flow resumes, the saturated water is moved to the equipment.

Specifically, water travels through hole 22 under pressure to fill body 20 and saturate pouch 40, thereby facilitating more and quicker saturation of water with composition 42. Alternatively or in addition to hole 22, other holes 23 and/or 24 may be used to facilitate even more or less and slower saturation of water with composition 42. At least one semi-permeable layer or membrane 91 coupled over hole 22 (and/or hole 23 and/or hole 24) helps to control the flow of water into body 20.

The water mixes with composition 42 in time-release pouch 40 to neutralize scale causing water conditions, such as calcium (e.g., calcium carbonate ($CaCO_3$)) and magnesium for example, and to neutralize pH. As the equipment runs, the saturated and treated water in body 20 is pulled out through feed assembly 50, which controls or regulates the flow of treated water from within the internal cavity of body 20 out to the water feed line. Through a venturi effect created by water flowing through holes 26 and 28 into body 20 adjacent/above feeding head assembly 50, treated water is pulled and flows out of body 20 through hole 35 to the equipment feed line.

In places where the description above refers to particular implementations, it should be readily apparent that a number of modifications may be made without departing from the spirit thereof and that these implementations may be alternatively applied. The accompanying CLAIMS are intended to cover such modifications as would fall within the true spirit and scope of the disclosure set forth in this document. The presently disclosed implementations are, therefore, to be considered in all respects as illustrative and not restrictive, the scope of the disclosure being indicated by the appended CLAIMS rather than the foregoing DESCRIPTION. All changes that come within the meaning of and range of equivalency of the CLAIMS are intended to be embraced therein.

The invention claimed is:

1. A feeding head assembly for eliminating scale conditions and maintaining a neutral pH in potable water, the feeding head assembly comprising:
    a housing defining an internal cavity and opposing first and second end openings;
    a first end plate defining a central through hole coupled to the first end opening of the housing;
    at least one filter media layer coupled between the first end opening of the housing and the inlet end plate;
    a restrictor plate defining a single through hole centrally located and configured to help control water flow, the restrictor plate within the housing and adjacent the at least one filter media layer;
    at least one semi-permeable membrane configured to help control water flow, the at least one semi-permeable membrane within the housing and adjacent the restrictor plate; and
    a second end plate defining a central through hole coupled within the second end opening of the housing.

2. The feeding head assembly of claim 1, wherein the housing has a smaller diameter than the first end plate.

3. The feeding head assembly of claim 1, wherein the at least one filter media layer comprises two filter media layers, the other of which coupled to the second end opening of the housing.

4. The feeding head assembly of claim 1, wherein the single through hole of the restrictor plate has a smaller diameter than the central through hole of the first end plate.

5. A chemical release system for eliminating scale conditions and maintaining a neutral pH in potable water, the chemical release system comprising:
    a cartridge comprising:
    a hollow body defining a first open end first open end opposite a second open end;
    a time-release pouch within the hollow body holding a composition that mixes with the potable water to eliminate scale conditions and maintain a neutral pH in the potable water;
    an end plug at least partially coupled within the hollow body at the second open end of the hollow body; and
    a feeding head assembly coupled within the hollow body between the time-release pouch and the first open end of the hollow body; and
    the feeding head assembly comprising:
        a housing defining an internal cavity and opposing first and second housing end openings;
        a first end plate defining a central through hole coupled to the first housing end opening;
        at least one filter media layer coupled between the first housing end opening and the first end plate;
        a restrictor plate defining a single through hole centrally located and configured to help control water flow, the restrictor plate within the housing and adjacent the at least one filter media layer;
        at least one semi-permeable membrane configured to help control water flow, the at least one semi-permeable membrane within the housing and adjacent the restrictor plate; and
        a second end plate defining a central through hole coupled within the second housing end opening, and
    a through hole configured to let water pass into the hollow body, the through hole defined through the hollow body and positioned between the first open end of the hollow body and the feeding head assembly.

6. The chemical release system of claim 5, further comprising an additional at least one semi-permeable membrane configured to help control water flow into the hollow body, the additional at least one semi-permeable membrane is coupled over the through hole defined through the hollow body.

7. The chemical release system of claim 6, wherein the additional at least one semi-permeable membrane coupled over the through hole defined in the hollow body is coupled on an inside surface of the hollow body.

8. A chemical release system for eliminating scale conditions and maintaining a neutral pH in potable water, the chemical release system comprising:
    a cartridge comprising:
    a hollow body defining a first open end opposite a second open end;
    a time-release pouch within the hollow body holding a composition that mixes with the potable water to eliminate scale conditions and maintain a neutral pH in the potable water;
    an end plate within the hollow body between the time-release pouch and the first open end of the hollow body; and
    a feeding head assembly coupled within the hollow body between the time-release pouch and the second open end of the hollow body;
    the feeding head assembly comprising:
        a housing defining an internal cavity and opposing first and second housing end openings;
        a first end plate defining a central through hole coupled to the first housing end opening, and configured to let water pass into the hollow body;
        at least one filter media layer coupled between the first housing end opening and the first end plate;
        a restrictor plate defining a single through hole centrally located and configured to help control water flow, the restrictor plate within the housing and adjacent the at least one filter media layer;

at least one semi-permeable membrane configured to help control water flow, the at least one semi-permeable membrane within the housing and adjacent the restrictor plate; and a second end plate defining a central through hole coupled within the second housing end opening;

at least one first through hole configured to let water pass into the hollow body, the at least one first through hole defined through the hollow body and positioned between the end plate and the feeding head assembly; and at least one second through hole configured to let water pass into the hollow body, the at least one second through hole defined through the hollow body and positioned between the feeding head assembly and the second open end of the hollow body.

9. The chemical release system of claim 8, wherein the at least one first through hole is positioned between the end plate and the pouch.

10. The chemical release system of claim 8, wherein the at least one first through hole is positioned at a mid section of the hollow body adjacent the pouch.

11. The chemical release system of claim 8, wherein the at least one first through hole is positioned between the feeding head assembly and the pouch.

12. The chemical release system of claim 8, wherein the at least one second through hole comprises two through holes.

13. The chemical release system of claim 8, further comprising an additional at least one semi-permeable membrane configured to help control water flow into the hollow body, the additional at least one semi-permeable membrane is coupled over the at least one first through hole defined through the hollow body.

14. The chemical release system of claim 13, wherein the additional at least one semi-permeable membrane coupled over the at least one through hole defined in the hollow body is coupled on an inside surface of the hollow body.

* * * * *